US008819420B1

(12) United States Patent
McKeeman et al.

(10) Patent No.: US 8,819,420 B1
(45) Date of Patent: Aug. 26, 2014

(54) ENCRYPTION AND DECRYPTION APPROACH THAT PREVENTS EXPOSING CLEAR-TEXT IN MEMORY

(75) Inventors: William M. McKeeman, Hollis, NH (US); Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1724 days.

(21) Appl. No.: 11/471,146

(22) Filed: Jun. 19, 2006

(51) Int. Cl.
*H04L 29/06* (2006.01)
*G06F 21/62* (2013.01)

(52) U.S. Cl.
CPC ........ *G06F 21/6218* (2013.01); *G06F 21/6209* (2013.01)
USPC .......................................... 713/165; 713/167

(58) Field of Classification Search
USPC ........ 713/165–182; 380/37–42; 707/100–104
See application file for complete search history.

(56) References Cited

U.S. PATENT DOCUMENTS

| | | | | |
|---|---|---|---|---|
| 7,320,008 | B1 * | 1/2008 | Colgrove | 1/1 |
| 2002/0049777 | A1 * | 4/2002 | Terayama et al. | 707/200 |
| 2002/0112114 | A1 * | 8/2002 | Blair et al. | 711/100 |
| 2002/0178290 | A1 * | 11/2002 | Coulthard et al. | 709/246 |
| 2005/0005128 | A1 * | 1/2005 | Lambert et al. | 713/182 |
| 2005/0091487 | A1 * | 4/2005 | Cross et al. | 713/165 |
| 2006/0235876 | A1 * | 10/2006 | Plouffe | 707/103 Y |
| 2007/0263876 | A1 * | 11/2007 | De Waal et al. | 380/286 |
| 2007/0276765 | A1 * | 11/2007 | Hazel et al. | 705/71 |

OTHER PUBLICATIONS

The MathWorks, "MatLab® Compiler, The Language of Technical Computing, User's Guide, Version 4," The MathWorks, Inc. (2004).
The MathWorks, "Technical Solutions," Retrieved online at http://www.mathworks.com/support/solutions/data/1-1B6FJ.html?solution=1-1B6FJ.
MatLab Programming, "Creating P-Code Files," Retrieved online at http://www.mathworks.com/access/helpdesk/help/techdoc/matlab_prog/index.html?/access/helpdesk/help/techdoc/matlab_prog/f7-38080.html.
PGP Attack FAQ: Practical attacks, Retrieved online at http://www.iusmentis.com/technology.encryption/pgp/pgpattackfaq/practicalattacks/#memoryspacesnooping.
Plover: Section.9.19. [Crypto] Cryptographic errors, Retrieved online at http://cve.mitre.org/docs/plover/SECTION.9.19.html#CRYPTO.PTEXT.MEM.
Kruger, Louis et al, "Towards Discovering and Containing Privacy Violations in Software," Technical Reports, Sep. 17, 2004.
Kuhn, Markus G., "Cipher Instruction Search Attack on the Bus-Encryption Security Microcontroller DS5002FP," *IEEE Transactions on Computers*, vol. 47(10):1153-1157 (1998).
Stuart, Michael et al, "Cryptography, Employ Strong Encryption in Your Apps with Our CryptoUtility Component," *MSDN Magazine*, pp. 1-10 (2004).

* cited by examiner

*Primary Examiner* — Kaveh Abrishamkar
(74) *Attorney, Agent, or Firm* — Pierce Atwood LLP; Kevin M. Farrell; Reza Sadr

(57) ABSTRACT

The present invention provides an encryption/decryption approach to protect valuable information from being represented in a clear-text form when an application processes the valuable information. The present invention processes a structured input file to create internal data structures and generates an encrypted output file from the extracted internal data structures. The encrypted file of internal data structures can be decrypted to enable further processing of the valuable information without representing the valuable information as clear-text in memory. Further, the decrypted internal data structures are stored at different locations in memory.

17 Claims, 8 Drawing Sheets

ENCRYPTION AND DECRYPTION APPROACH THAT PREVENTS EXPOSING CLEAR-TEXT IN MEMORY

FIELD OF THE INVENTION

The present invention relates to an approach for encrypting and decrypting a file such that the clear-text of the file is not stored in memory when an application accesses it.

BACKGROUND

It is common to encrypt information that includes valuable content. To view the encrypted information a user must have a computer program that can read in the encrypted information and decrypt the information. Many computer programs or applications can read either encrypted or clear-text information. Clear-text information refers to unencrypted text that is machine readable. Many applications also provide files that use special formats. Such applications use undocumented internal data structures for processing these files. The files that use special formats can only be read by an application that recognizes the internal data structures.

Conventionally, applications are developed to read in and decrypt the encrypted information that is in a particular file format. FIG. 1 illustrates a block diagram of the conventional approach that is used to read encrypted information with an application. To begin, information can be provided in a clear-text format 110. The clear-text information 110 is passed through an encryption program 120 that encrypts the clear-text information 110 and outputs an encrypted file 140. An application 150 can be used to read the encrypted file 140. In the case depicted in FIG. 1, the application 150 includes a decryption program 160 and an input function 170.

When the application 150 is used to read in the encrypted file 140, the encrypted file 140 is first passed through the decryption program 160. The decryption program 160 decrypts the encrypted file 140 to produce a clear-text form 165. After the decryption, the clear-text form 165 is stored in memory so that the application 150 can process it. Once the file is decrypted and stored in clear-text form 165 in memory, the application 150 uses the input function 170 to read the data and to create internal data structures 175 that allow the application 150 to process the file. These internal data structures 175 are typically sets of tables and data structures that represent the essential information derived from the file. When the application 150 completes the processing the clear-text form 165 can be erased from memory.

A disadvantage of the conventional approach becomes evident when the application 150 is paused or killed. This is because when encrypted data is read in and decrypted by the application 150, the data it is stored as clear-text in memory 165. When the application 150 is paused or killed, the clear-text information 165 is left in a readable core image. Typically, the core image of the decrypted information (clear-text) is left in memory where it can be easily found.

This provides an easy opportunity for someone to find the clear-text information that includes valuable content. For example, there are many utility programs that exist on several operating systems that will find and print clear-text strings from inside of a binary file such as a core dump image.

It is therefore a desirable to have a more secure approach that does not suffer from the vulnerability of the conventional approach. More specifically, it is desired that upon an event that pauses or kills an application, the application does not leave valuable information in memory as clear-text.

SUMMARY OF THE INVENTION

Embodiments of the present invention provide a new approach for protecting valuable information. According to one embodiment, an input file containing clear-text is processed by an input program. The processing of the input file by the input program results in the creation of internal data structures of the input file. The internal data structures can be serialized, encrypted and written to an output file. Further embodiments of the present invention provide for processing the encrypted output file. According to one embodiment, the encrypted output file is decrypted, deserialized and the internal data structures are reconstructed. The encryption and decryption approach provided by the embodiments of the present invention protect valuable information that is being processed in the application by not representing the valuable information in clear-text form in memory. Anyone trying to attack the application will only find the internal data structures of the file, which are undocumented and include binary data.

In one aspect of the present invention, a method in a computing system is disclosed. The method includes the step of providing an encrypted file of internal data structures of a structured input file of clear-text. The method further provides the step of decrypting the encrypted file of internal data structures to enable further processing of the input file of clear-text. A first decrypted internal data structure of the decrypted internal data structures is stored at a first physical and/or virtual location in memory. A second decrypted internal data structure of the decrypted internal data structures is stored at a second physical and/or virtual location in memory, where the first and second locations are not contiguous.

In another aspect of the present invention, a system in a computing system is disclosed. The system provides a decryption program for receiving an encrypted file of internal data structures that are serialized and encrypted, the decryption program being operable to decrypt and deserialize the encrypted file.

In another aspect of the present invention, a medium that holds instructions for performing steps that are executable with a computing system is disclosed. The instructions for performing enables the steps of providing an encrypted file of internal data structures of a structured input file of clear-text. The instructions also provide the step of decrypting the encrypted file of internal data structures to enable further processing of the input file of clear-text. A second decrypted internal data structure of the decrypted internal data structures is stored at a second physical and/or virtual location in memory, where the first and second locations are not contiguous.

In yet another aspect of the present invention, a method in a computing system is disclosed. The method includes the step of processing a structured input file to create internal data structures. The method further provides the step of generating from the created internal data structures an encrypted output file that represents the created internal data structures that are associated with the input file.

In still another aspect of the present invention, a system in a computing system is disclosed. The system provides a structured input file, an input function and an output function. The input function creates internal data structures from the structured input file. The output function encrypts the created internal data structures to produce an encrypted output file.

In an additional aspect of the present invention, a medium that holds instructions for performing steps that are executable with a computing system is disclosed. The instructions for performing enable the step of processing a structured input file to create internal data structures. The instructions also enable the step of generating from the created internal data structures an encrypted output file that represents the created internal data structures that are associated with the input file.

In a further aspect of the present invention, a method in a computing system is disclosed. The method includes the steps creating a plurality of internal data structures of a structured input file of clear-text on a first computing device, where the creation is based on identifiers in the input file, and generating a serialized and encrypted output file on the first computing device that represents the internal data structures associated with the input file. The method further provides transmitting the output file to a second computing device, the second computer being operable to decrypt the output file. The transmitted output file can be received by the second computing device which provides for decrypting the output file of the encrypted internal data structures, deserializing the internal data structures of the output file after the output file is decrypted, and processing the internal data structures to obtain the clear-text of the input file. A first internal data structure of the decrypted internal data structures is stored at a first physical and/or virtual location in memory. A second decrypted internal data structure of the decrypted internal data structures is stored at a second physical and/or virtual location in memory, where the first and second locations are not contiguous.

In yet a further aspect of the present invention, a medium that holds instructions for performing steps that are executable with a computing system is disclosed. The instructions for performing enable the steps of creating a plurality of internal data structures of a structured input file of clear-text on a first computing device, where the creation being based on identifiers in the input file, and generating a serialized and encrypted output file on the first computing device that represents the internal data structures associated with the input file. The instructions further provide the step of transmitting the output file to a second computing device, where the second computer is operable to decrypt the output file. The transmitted output file can be received by the second computing device which provides for decrypting the output file of the encrypted internal data structures, deserializing the internal data structures of the output file after the output file is decrypted, and processing the internal data structures to obtain the clear-text of the input file. A first internal data structure of the decrypted internal data structures is stored at a first physical and/or virtual location in memory. A second decrypted internal data structure of the decrypted internal data structures is stored at a second physical and/or virtual location in memory, where the first and second locations are not contiguous.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention provides a new approach for protecting valuable information. According to the illustrative embodiment, an input file containing clear-text is processed by an input program. The processing of the input file by the input program results in the creation of internal data structures of the input file. The internal data structures are encrypted and written to an output file. During the encryption the internal data structures can be processed in a manner that is similar to a process of serialization. The serialization process converts the internal data structures into serial byte streams.

The illustrative embodiment of present invention further provides for processing the encrypted output file. According to the illustrative embodiment, when an application starts an input process is performed. The input process involves decrypting the encrypted output file and reconstructing the internal data structures. The input process can also deserialize the internal data structures. Once the encrypted output file has been decrypted the application can process the internal data structures.

The term clear-text refers to unencrypted text that is machine readable. Some applications can read application specific files that are formatted in a specific manner. These file include internal data structures that represent the essential information derived from the file.

The encryption and decryption approach provided by the illustrative embodiment protects valuable information that is being processed in the application because the information never appears in clear-text form in memory and the decrypted internal data structures are stored at different physical and virtual locations. Therefore, anyone trying to attack the application will only find the internal data structures of the file. Since these internal data structures are typically not documented and can include binary data, and the decrypted data structures are store at different locations in memory, it is difficult for someone to find the valuable information. While inspection of enough core images may break this encryption, the illustrative embodiment ensures that security cannot be compromised by simple, readily available utility tools. Thus, significant effort would be required to reconstruct a file that is encrypted and decrypted in accordance with the illustrative embodiment. In addition, since the input data is significantly obscured by the process provided by the illustrative embodiment, a lower level of encryption, than one would be used on the clear-text, can be used to obtain the same effective level of protection. As a result, a decrease in the time required to read the data can be achieved.

Figure 1:
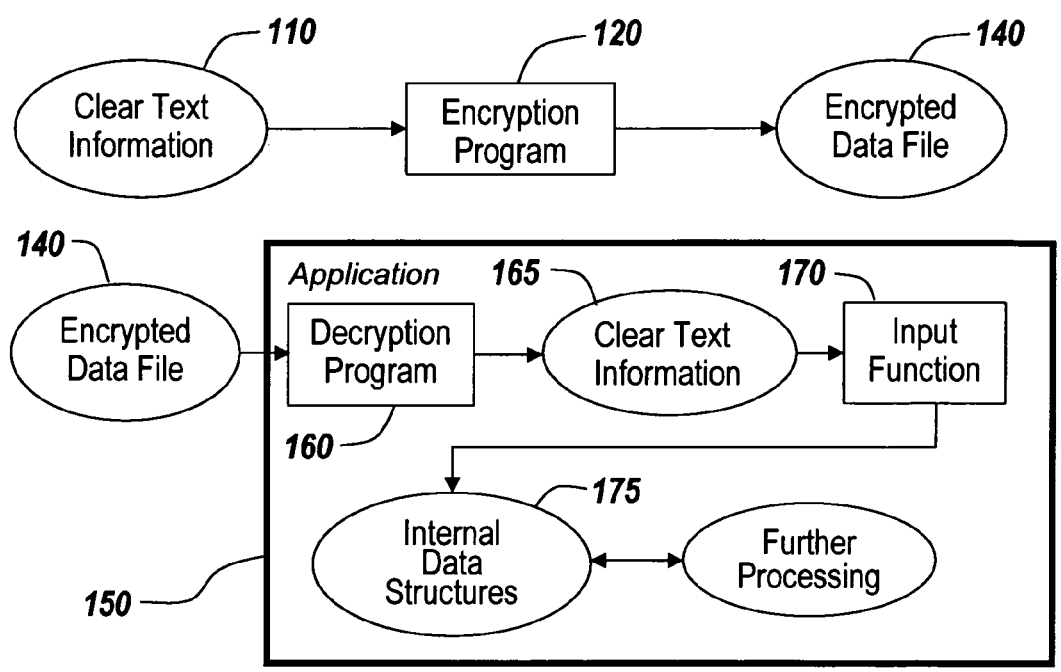
FIG. 1 depicts a conventional encryption/decryption scheme.
Figure 2:
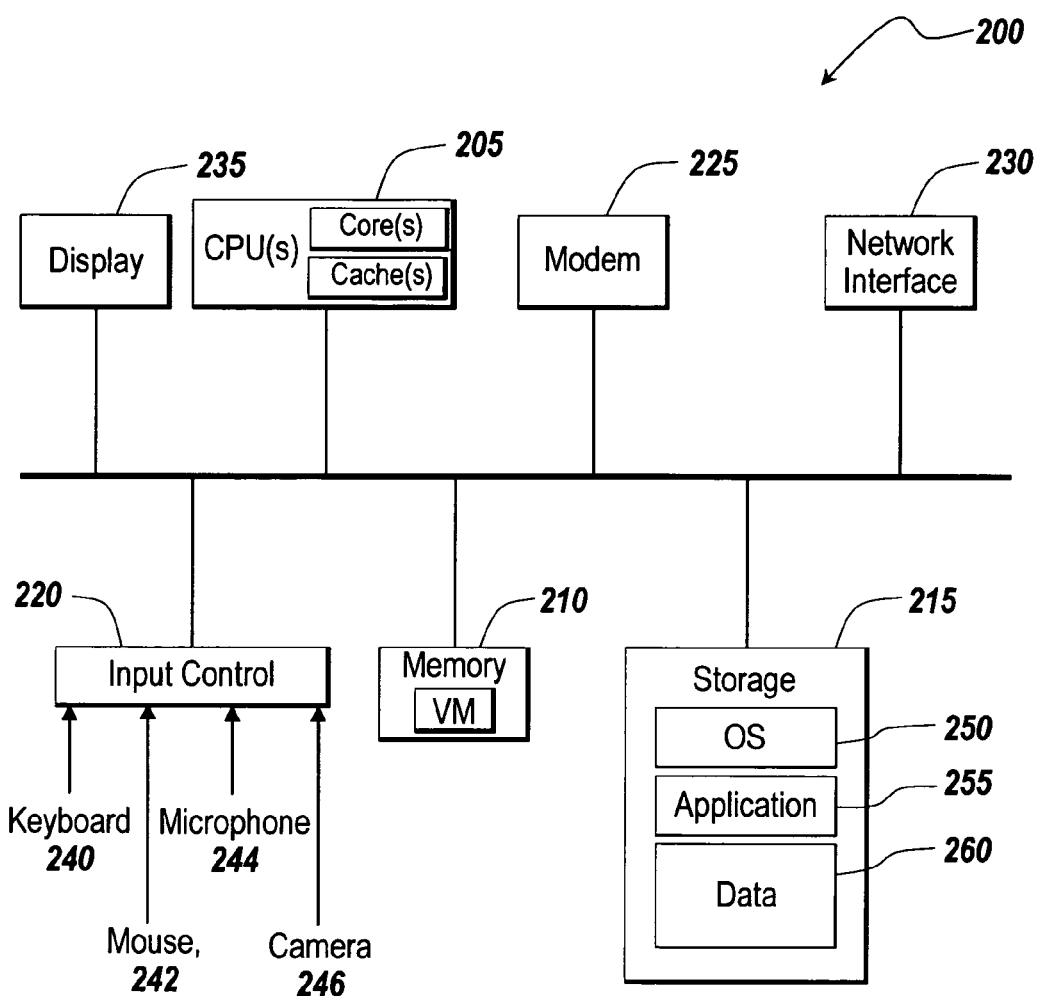
FIG. 2 depicts an exemplary computing device suitable for practicing the illustrative embodiment of the present invention.

FIG. 2 is an exemplary computing device 200 suitable for practicing the illustrative embodiment of the present invention. One of ordinary skill in the art will appreciate that the computing device 200 is intended to be illustrative and not limiting of the present invention. The computing device 200 may take many forms, including but not limited to a workstation, server, network computer, quantum computer, optical computer, bio computer, Internet appliance, mobile device, a pager, a tablet computer, and the like.

The computing device 200 may be electronic and include a Central Processing Unit (CPU) 205, memory 210, storage 215, an input control 220, a modem 225, a network interface 230, a display 235, etc. The CPU 205 controls each component of the computing device 200 to provide for encrypting and/or decrypting files. The memory 210 temporarily stores instructions and data and provides them to the CPU 205 so that the CPU 205 operates the computing device 200 and runs any program necessary for encrypting and/or decrypting files.

Optionally, the computing device 200 may include multiple CPUs for executing software loaded in the memory 210, and other programs for controlling system hardware. Each of the CPUs can be a single or multiple core processor. The code loaded in the memory 210 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC). Further, the part of the applications may be run on analog electronic devices or other resources may be used to run part of the application, such as graphics processing units (GPUs).

The storage 215 usually contains software tools for applications. The storage 215 includes, in particular, code 250 for the operating system (OS) of the device 200, code 255 for applications running on the operation system including the applications for encrypting and decrypting files and data 260. Those of ordinary skill in the art will appreciate that parts of the applications can be stored in the CPU cache or memory 210 as well, much like the data, and even the OS, or they can be stored on the network described below with reference to FIG. 3.

The input control 220 may interface with a keyboard 240, a mouse 242, a microphone 244, a camera 246 and other input devices. The computing device 200 may receive through the input control 220 input data, such as a clear-text file or an encrypted file of internal data structures. The computing device 200 may display on the display 235 user interfaces for displaying the input file or encrypted file.

Figure 3:
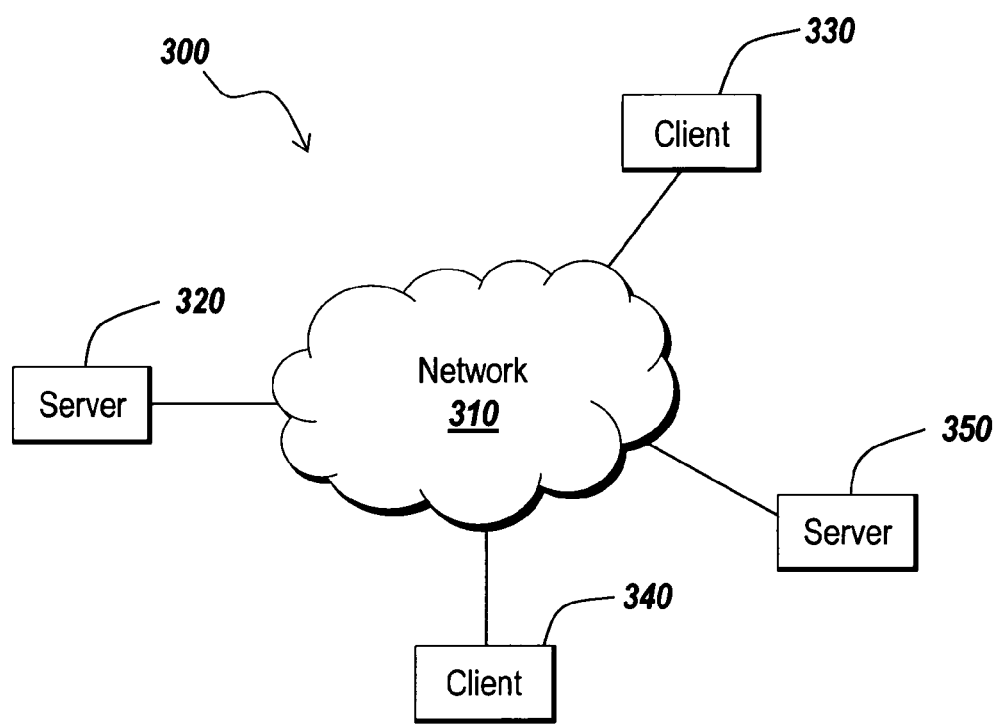
FIG. 3 depicts an exemplary distributed system suitable for the distributed implementation of the illustrative embodiment.

FIG. 3 is an exemplary network environment 300 suitable for the distributed implementation of the illustrative embodiment. The network environment 300 may include one or more servers 320 and 350 coupled to clients 330 and 340 via a communication network 310. The network interface 230 and the modem 225 of the computing device 200 enable the servers 320 and 350 to communicate with the clients 330 and 340 through the communication network 310. The communication network 310 may include Internet, intranet, LAN (Local Area Network), WAN (Wide Area Network), MAN (Metropolitan Area Network), wireless network (e.g., using IEEE 802.11 and Bluetooth), etc. In addition the network may use middleware, such as CORBA or DCOM to allow a computer on the network to communicate directly with a device located on another computer that is connected to the network. The communication facilities can support the distributed implementations of the present invention.

In the network environment 300, the servers 320 and 350 may provide the clients 330 and 340 with software components or products under a particular condition, such as a license agreement. The software components or products may include those for encrypting or decrypting a file. In operation, the client 340 may generate a clear-text file containing valuable information. The client 340 can encrypt the clear-text file using software that can be provided by server 320. The encrypted file contains internal data structures of the clear-text file. The client 340 can send the encrypted file to the server 320 and the server 320 can decrypt the encrypted file for further processing of the clear-text file. The server 340 can send information back to the client 320 indicating that the encrypted file has been processed. The information sent back to the client may or may not be encrypted.

Figure 4:
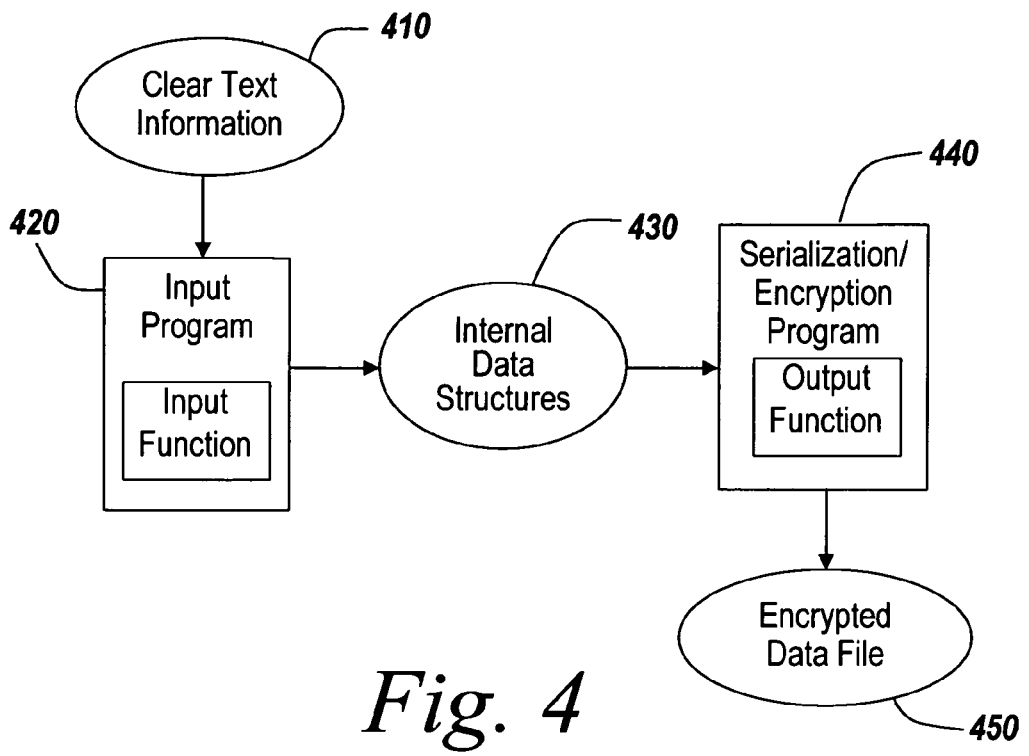
FIG. 4 depicts a high-level block diagram of the encryption process in accordance with the illustrative embodiment of the present invention.
Figure 5:
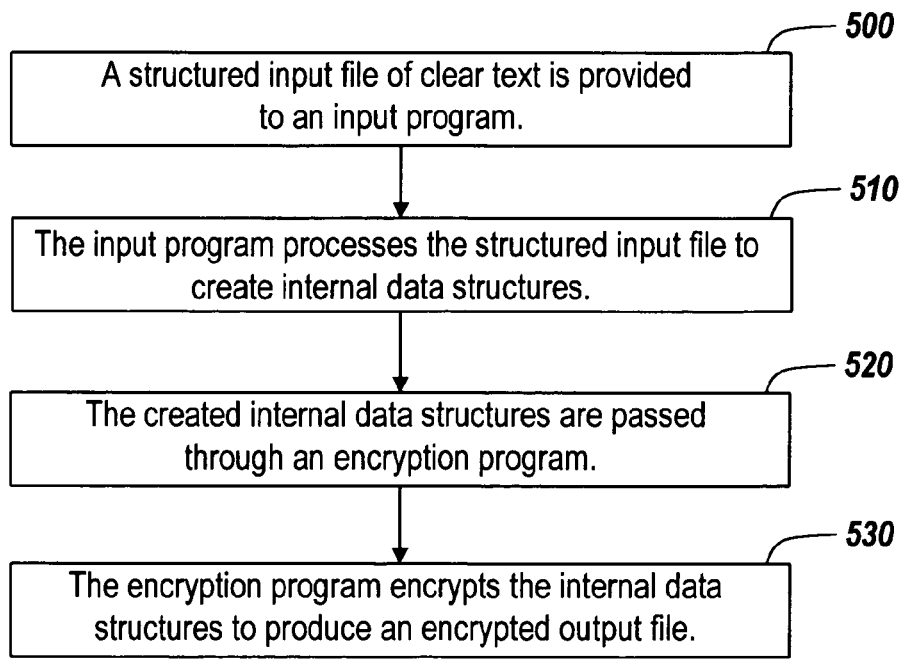
FIG. 5 is a flow diagram that illustrates the steps for implementing the encryption process of the illustrative embodiment.

FIG. 4 is a high-level block diagram of the components of the encryption process. FIG. 5 is a flow diagram that illustrates the steps taken to encrypt a structured input file according to the illustrative embodiment. A structured input file 410 of clear-text is provided to an input program 420 that has an input function (step 500). The input program 420 uses the input function to process the structured input file 410 to create internal data structures 430 (step 510). To create the internal data structures 430 the input program 420 identifies the internal data structures 430 based on identifiers in the input file 410. The input program 420 may use a parser to parse the input file into components based on the identifiers. Some examples of identifiers can include, but are not limited to special characters such as '#' and '%', commas, semi-colons, colons or blank spaces. The created internal data structures 430 are passed through an encryption program 440 (step 520). The encryption program 440 that has an output function to encrypt the internal data structures 430 to produce an encrypted output file 450 (step 530). Prior to encrypting the internal data structures 430 of the input file, the internal data structures can be serialized by a serialization program that can be a part of the encryption program 440 or can be separate from the encryption program 440. The serialization program can convert the internal data structures into a serial stream of bytes. Each internal data structure is recognized by the serialization program and the serialization program provides a serialization method for each of the internal data structures.

While the input program 420 and the encryption program 440 are depicted as individual programs one skilled in the art will recognize that the input program 420 and the encryption program 440 can be combined as a single program that creates internal data structures from a structured clear-text file and encrypts the internal data structures that are created to produce an encrypted output file.

Figure 6:
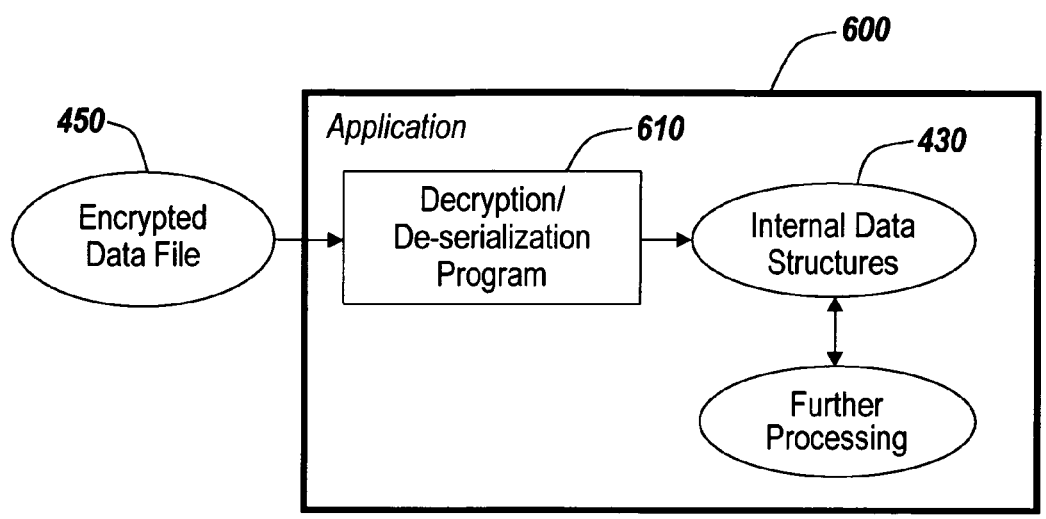
FIG. 6 depicts a high-level block diagram of the decryption process in accordance with the illustrative embodiment of the present invention.
Figure 7:
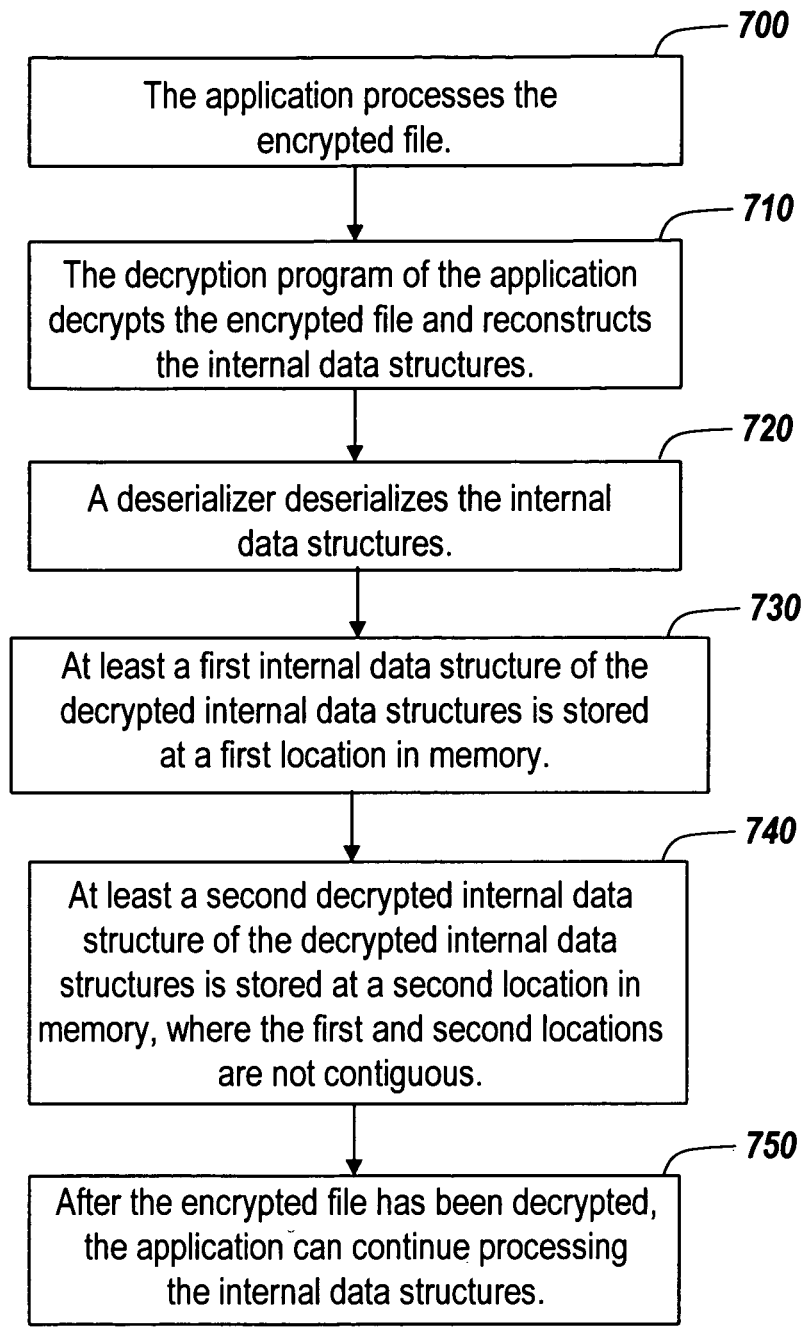
FIG. 7 is a flow diagram that illustrates the steps for implementing the decryption process of the illustrative embodiment.

FIG. 6 is a high-level block diagram of an exemplary application 600 for decrypting and deserializing the encrypted file. FIG. 7 is a flow diagram that illustrates the steps taken by the application 600 to read the encrypted file. The application 600 includes decryption program 610. When the application 600 is launched an input process is performed. The application 600 processes the encrypted file 450 (step 700). The decryption program 610 of the application 600 decrypts the encrypted file 450 and reconstructs the internal data structures 430 (step 710). The decryption program can also include a deserializer that deserializes the internal data structures 430 (step 720). Alternatively there may be a separate deserialization program in the application 600. The deserialization program is operable to convert a stream of bytes that have been serialized back to the corresponding internal data structure. After the encrypted file 450 has been decrypted, a first internal data structure of the decrypted internal data structures 430 is stored at a first physical and/or virtual location in memory (step 730), and a second decrypted internal data structure of the decrypted internal data structures 430 is stored at a second physical and/or virtual location in memory, where the first and second locations are not contiguous (step 740). The application 600 can continue processing the internal data structures 430 (step 750).

Since the application 600 never represents the file 450 in clear-text form in memory, the valuable information contained the file 450 is protected. The application 600 stores the internal data structures 430, which are typically not documented, at different locations in memory. Further, by using internal data structures 430 and by storing the internal data structures at different physical and virtual locations in memory, the protection cannot be compromised with the use of readily available utility tools. Additionally, since the input data is significantly obscured, a lower level of encryption can be used. As a result using a lower level of encryption, a decrease in the time required to read the data can be achieved.

Figure 8:
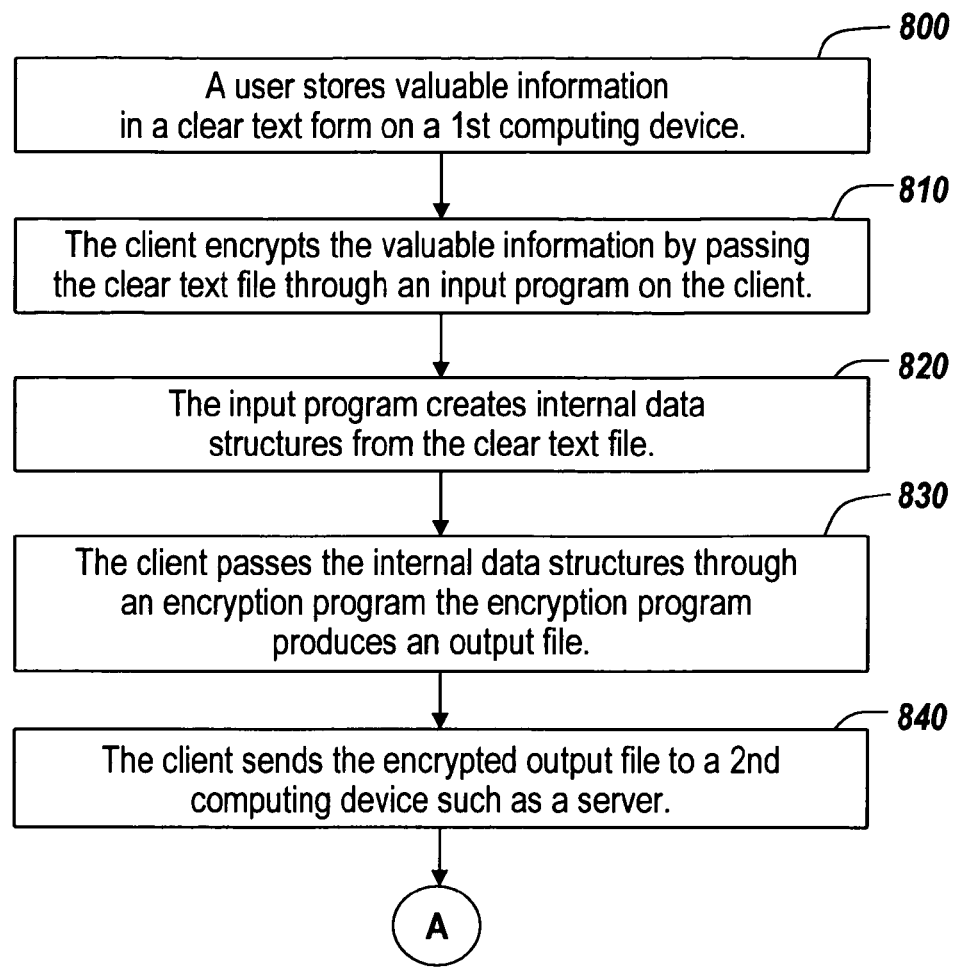
FIG. 8 is a flow diagram that illustrates the steps for implementing the encryption processes of the illustrative embodiment in a distributed network.

FIG. 8 is a flow diagram that provides a further example of the encryption process of the illustrative embodiment of the present invention. A user stores valuable information in a clear-text form on the client 330 (step 800). The valuable information can include, but is not limited to a name, an address, a telephone number, account information such as a credit card number. For example, the client 330 can access a web site that provides a form that the client 330 fills in. To protect the valuable information the client 330 can encrypt the valuable information by passing the clear-text file through an input program on the client 330 (step 810). The input program creates internal data structures from the clear-text file (step 820). After creating the internal data structures, the client 330 passes the internal data structures through an encryption program the encryption program produces an output file (step 830). The client 330 sends the encrypted output file to the server 320 (step 840). Since the output file contains only the internal data structures the file size is reduced as compared to an encrypted clear-text file. The reduced size decreases the time necessary to transmit the encrypted file as well as the time necessary to decrypt the file.

Figure 9:
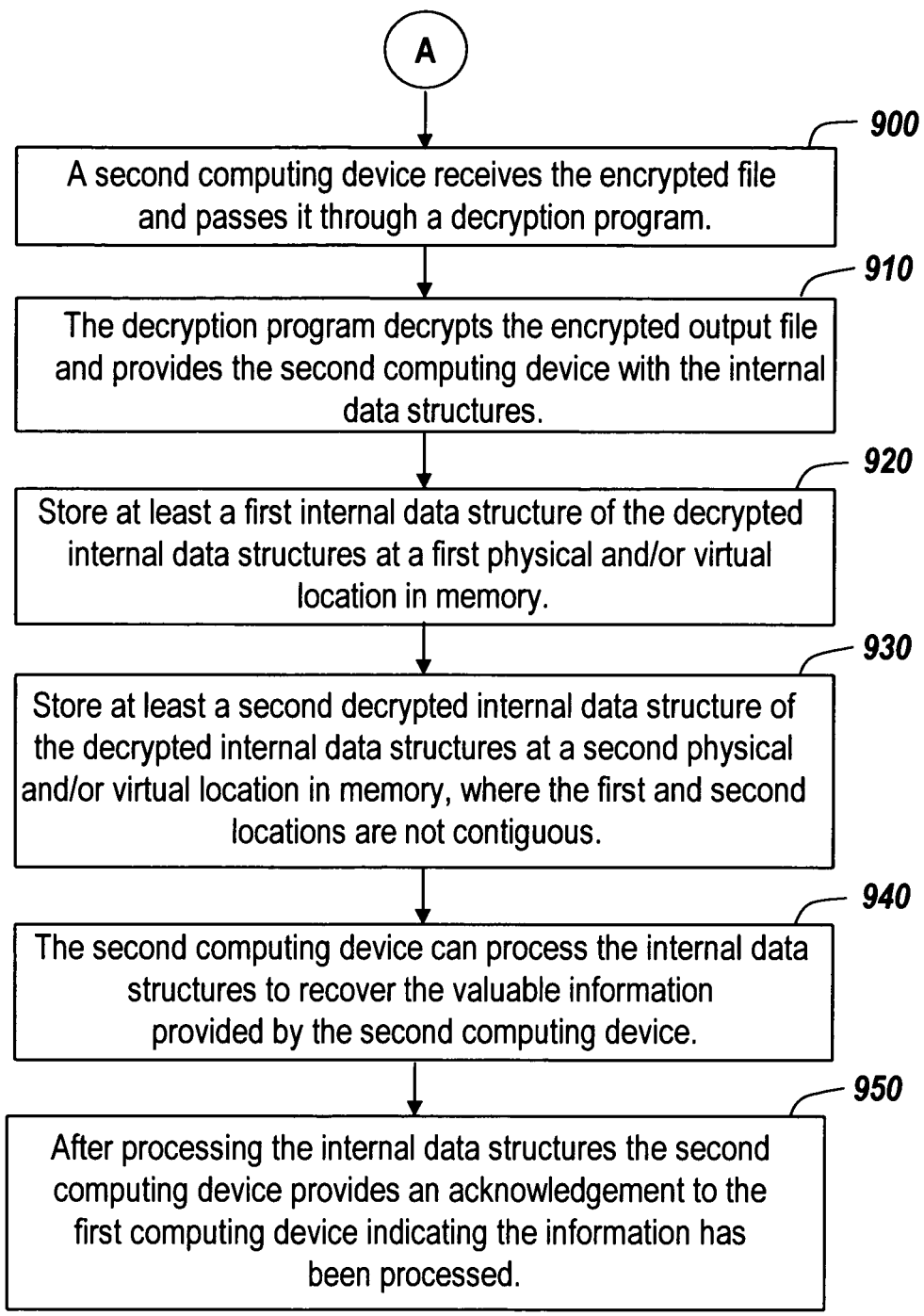
FIG. 9 is a flow diagram that illustrates the steps for implementing the decryption processes of the illustrative embodiment in a distributed network.

FIG. 9 is a flow diagram that provides a further example of the decryption performed by the illustrative embodiment. Upon receiving the encrypted output file from the client 330, the server 320 passes the encrypted file through a decryption program (step 900). The decryption program decrypts the encrypted output file and provides the server 320 with the internal data structures associated with the clear-text file (step 910). A first internal data structure of the decrypted internal data structures is stored at a first physical and/or virtual location in memory (step 920), and a second decrypted internal data structure of the decrypted internal data structures is stored at a second physical and/or virtual location in memory, where the first and second locations are not contiguous (step 930). The server 320 can process the internal data structures to recover the valuable information provided by the client 330 (step 940). After processing the internal data structures the server 320 can provide an acknowledgement to the client indicating the information has been processed (step 950). Since the server 320 never stores the clear-text file in memory and the internal data structures are not all stored contiguously, the valuable information provided by the client 330 is protected. While the internal data structures of the file are stored in memory, the internal data structures are typically undocumented, and therefore, unknown. By storing the decrypted internal data structures at different locations in the memory, the valuable information is protected from attacks using utility software.

The present invention may be provided as one or more computer-readable programs embodied on or in one or more mediums. The mediums may be, but are not limited to a hard disk, a compact disc, a digital versatile disc, a flash memory card, a PROM, a RAM, a ROM, a magnetic tape, or even the genome in a cell nucleus. In general, the computer-readable programs may be implemented in any programming language. Some examples of languages that can be used include Python, C, C++, C#, or JAVA. Further, the computer readable programs can be implemented in a hardware description language or any other language that allows prescribing computation such as, for example, DNA. The software programs may be stored on or in one or more mediums as object code.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method:
    processing a structured input file of clear-text using an input function,
        the structured input file of clear-text being an unencrypted machine-readable file, and
        the processing performed using a computing device;
    creating internal data structures of the structured input file clear-text based on the processing,
        the internal data structures to allow an application to interact with the structured input file of clear-text,
    encrypting the internal data structures without encrypting the structured input file of clear-text;
    generating an encrypted file of internal data structures, the generating based on the encrypting;
    decrypting the encrypted file of internal data structures to provide decrypted internal data structures;
    storing a first decrypted internal data structure from the decrypted file of internal data structures in a first location; and
    storing a second decrypted internal data structure from the decrypted file of internal data structures in a second location, the second location being discontiguous with respect to the first location.

2. The method of claim 1, wherein the internal data structures are serialized in the encrypted file.

3. The method of claim 2, further comprising:
    deserializing the internal data structures after the encrypted file is decrypted.

4. A non-transitory computer-readable medium storing computer-executable instructions that when executed cause a computing device to:
- process a structured input file of clear-text using an input function, the structured input file of clear-text being an unencrypted machine-readable file, and
- create internal data structures of the structured input file of clear-text based on the processing,
  - the internal data structures to allow an application to interact with the structured input file of clear-text, and
- encrypt the internal data structures without encrypting the structured input file of clear-text;
- generate an encrypted file of internal data structures, the generating based on the encrypting;
- decrypt the encrypted file of internal data structures to provide decrypted internal data structures;
- store a first decrypted internal data structure from the decrypted internal data structures in a first location; and
- store a second decrypted internal data structure from the decrypted internal data structures in a second location, the second location being discontiguous with respect to the first location.

5. The medium of claim 4, wherein the internal data structures are serialized in the encrypted file.

6. The medium of claim 5, wherein the instructions when executed further cause the computing device to:
- deserialize the internal data structures after the encrypted file is decrypted.

7. A computer-implemented method comprising:
- receiving a structured input file of clear-text using an input function,
  - the structured input file of clear-text being an unencrypted machine-readable file, and
  - the receiving performed using a computing device;
- processing, using the input function, the structured input file of clear-text;
- identifying identifiers in the structured input file, the identifying based on the processing;
- creating internal data structures of the structured input file of clear-text based on the identifying, the internal data structures:
  - allowing an application to interact with the structured input file of clear-text, where:
    - the application includes a decryption process, and
  - representing information derived from the structured input file;
- encrypting the internal data structures without encrypting the structured input file;
- generating an encrypted output file based on the encrypting; and
- transmitting the encrypted output file to the decryption process of the application for decryption.

8. The method of claim 7, wherein the generating further comprises:
- serializing the internal data structures extracted from the structured input file prior to encrypting the created internal data structures.

9. A computer-implemented method comprising:
- providing a structured input file to an input function,
  - the structured input file being an unencrypted machine-readable file, and
  - the providing performed using a corn device;
- processing, using the input function, the structured input file;
- identifying identifiers in the structured input file, the identifying based on the processing;
- creating internal data structures of the structured input file based on the identifying, the internal data structures:
  - allowing an application to interact with the structured input file, and
  - representing information derived from the structured input file;
- encrypting the internal data structures without encrypting the structured input file; and
- generating an encrypted output file using an output function executing on the computing device, the generating based on the encrypting.

10. The method of claim 9, further comprising:
- storing portions of the structured input file in different locations using a storage component.

11. The method of claim 9, wherein the output function serializes the internal data structures prior to encrypting the internal data structures.

12. A non-transitory computer-readable medium storing computer-executable instructions that when executed cause a computing device to:
- process a structured input file of clear-text using an input function, the structured input file of clear-text being an unencrypted machine-readable file;
- identify identifiers in the structured input file of clear-text, the identifying based on the processing;
- create internal data structures of the structured input file of clear-text based on the identifying, the internal data structures:
  - allowing an application to interact with the structured input file of clear-text, and
  - representing information derived from the structured input file of clear-text;
- encrypt the internal data structures without encrypting the structured input file of clear-text,
- generate an encrypted output file, the generating based on the encrypting; and
- transmit the encrypted output file to a decryption process of the application for decryption.

13. The medium of claim 12, wherein the instructions further cause the computing device to:
- serialize the internal data structures created from the structured input file of clear-text prior to encrypting the structured input file of clear-text.

14. A computer-implemented method comprising:
- processing a structured input file of clear-text on a first computing device,
  - the structured input file of clear-text being an unencrypted machine-readable file, and
  - the processing performed using a computing device;
- identifying identifiers in the structured input file of clear-text, the identifying based on the processing;
- creating internal data structures of the structured input file of clear-text based on the identifying, the internal data structures:
  - allowing an application to interact with the structured input file of clear-text, and
  - representing information derived from the structured input file of clear-text;
- generating a serialized and encrypted output file with the first computing device from the internal data structures without encrypting the structured input file of clear-text; and
- transmitting the serialized and encrypted output file to a second computing device.

15. The method of claim 14, wherein the method further comprises:
- receiving the output file with the second computing device;
- decrypting the output file of the encrypted internal data structures;
- deserializing the internal data structures of the output file after the output file is decrypted;
- storing a first decrypted internal data structure of the decrypted internal data structures in a first location;
- storing a second decrypted internal data structure of the decrypted internal data structures in a second location, wherein the second location is not contiguous with the first location; and
- processing, using the application, the internal data structures to obtain the clear-text of the structured input file.

16. A non-transitory computer-readable medium storing computer-executable instructions that when executed cause one or more computing device to:
- process a structured input file of clear-text on a first computing device,
  - the structured input file of clear-text being an unencrypted machine-readable file;
- identify identifiers in the structured input file of clear-text, the identifying on the processing,
- create internal data structures of the structured input file of clear-text based on the identifying, the internal data structures:
  - allowing an application to interact with the structured input file of clear-text, and
  - representing information derived from the structured input file of clear-text;
- generate a serialized and encrypted output file on the first computing device from the internal data structures without encrypting the structured input file of clear-text; and
- transmit the serialized and encrypted output file to at least a second computing device, the second computer being operable to decrypt the output file.

17. The medium of claim 16, wherein the instructions when executed further cause the one or more computing devices to:
- receive the output file with the second computing device;
- decrypt the output file of the encrypted internal data structures;
- deserialize the internal data structures of the output file after the output file is decrypted;
- store a first decrypted internal data structure of the decrypted internal data structures in a first location;
- store a second decrypted internal data structure of the decrypted internal data structures in a second location, wherein the second location is not contiguous with the first location; and
- process, using the application, the internal data structures to obtain the clear-text of the structured input file.

* * * * *

UNITED STATES PATENT AND TRADEMARK OFFICE
CERTIFICATE OF CORRECTION

| | | |
|---|---|---|
| PATENT NO. | : 8,819,420 B1 | Page 1 of 1 |
| APPLICATION NO. | : 11/471146 | |
| DATED | : August 26, 2014 | |
| INVENTOR(S) | : William M. McKeeman et al. | |

It is certified that error appears in the above-identified patent and that said Letters Patent is hereby corrected as shown below:

In the Claims

Claim 1, Column 8, line 40, "A computer-implemented method:" should read
--A computer-implemented method comprising:--

Claim 1, Column 8, lines 46-47, "input file clear-text" should read --input file of clear-text--

Claim 9, Column 9, line 63, "corn" should read --computing--

Claim 16, Column 11, line 24, "the identifying on the processing" should read --the indentifying based on the processing--

Signed and Sealed this
Seventeenth Day of February, 2015

Michelle K. Lee
*Deputy Director of the United States Patent and Trademark Office*